W. J. DAYS.
SAW SHARPENING MACHINE.
APPLICATION FILED JULY 23, 1917.
1,274,012.
Patented July 30, 1918.
3 SHEETS—SHEET 1.
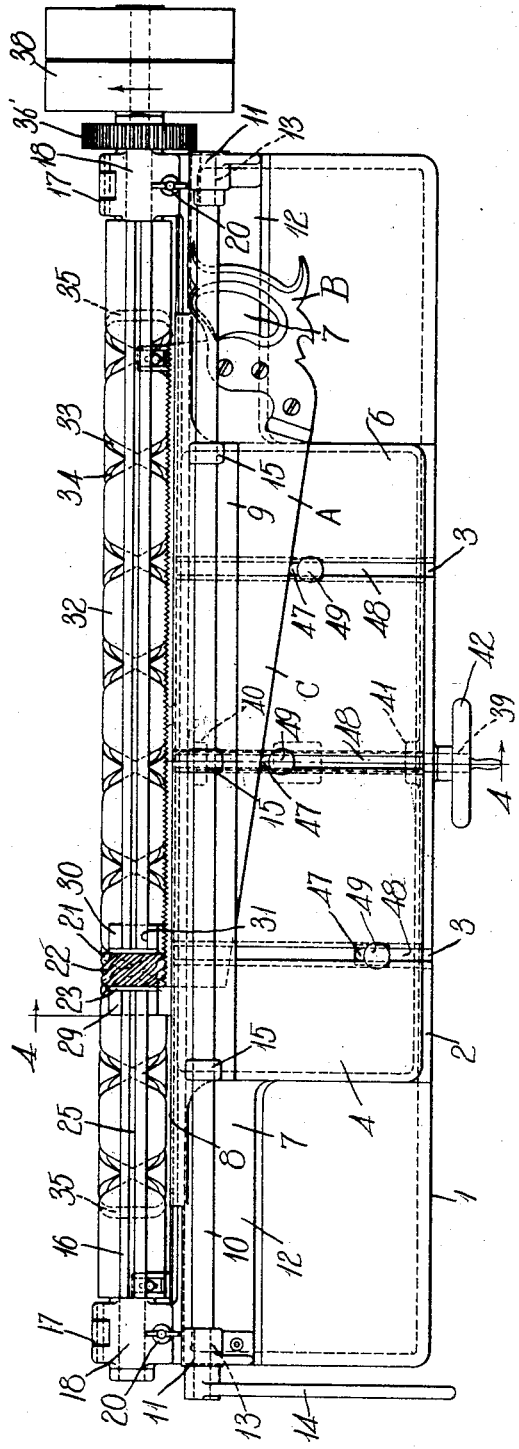
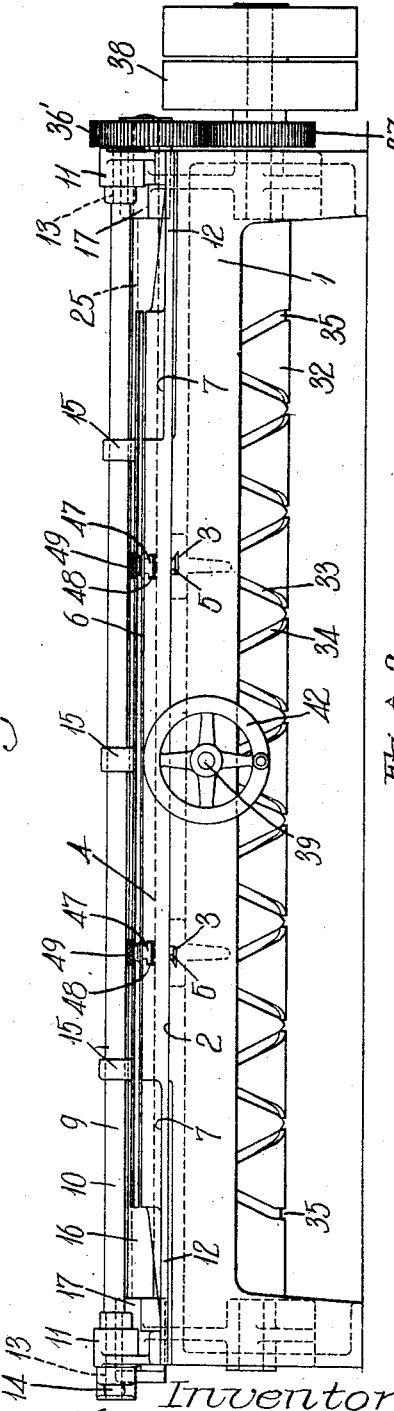

W. J. DAYS.
SAW SHARPENING MACHINE.
APPLICATION FILED JULY 23, 1917.
1,274,012.
Patented July 30, 1918.
3 SHEETS—SHEET 3.
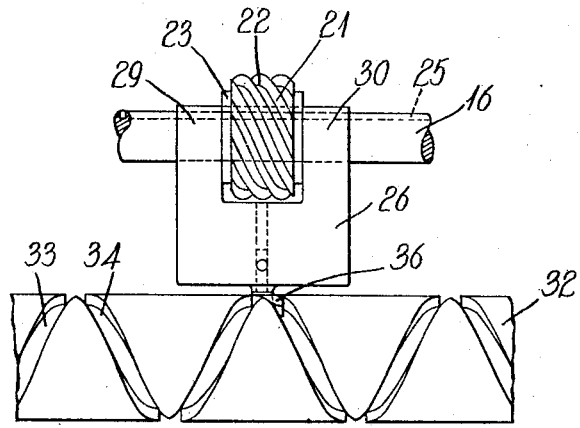
Fig. 5.
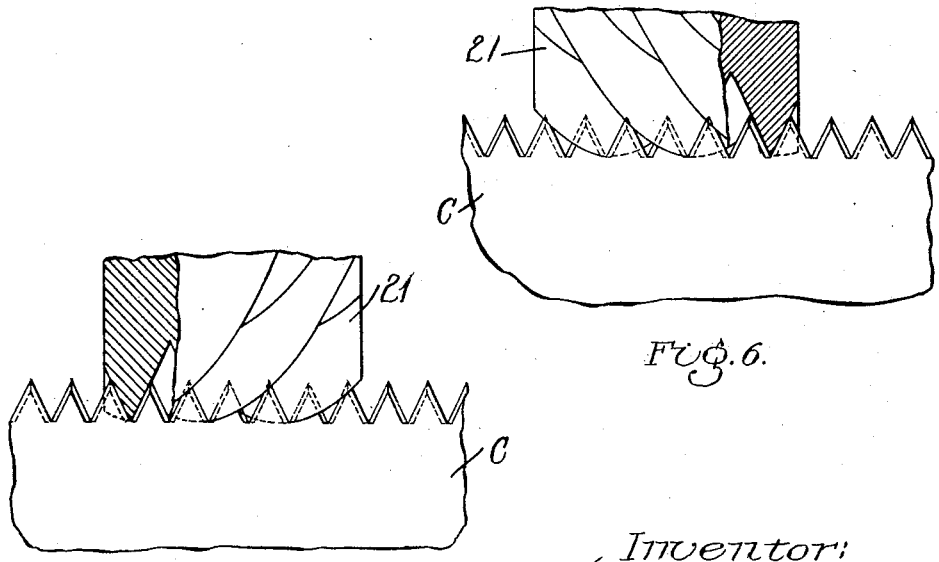
Fig. 6.
Fig. 7.
Inventor:
William J. Days
By his attorney
Charles J. Gooding

UNITED STATES PATENT OFFICE.

WILLIAM J. DAYS, OF BOSTON, MASSACHUSETTS.

SAW-SHARPENING MACHINE.

1,274,012.      Specification of Letters Patent.      Patented July 30, 1918.

Application filed July 23, 1917. Serial No. 182,108.

*To all whom it may concern:*

Be it known that I, WILLIAM J. DAYS, a citizen of the United States, residing at Dorchester, Boston, in the county of Suffolk and State of Massachusetts, have invented new and useful Improvements in Saw-Sharpening Machines, of which the following is a specification.

This invention relates to a machine for sharpening saws and its object is to provide a machine adapted to quickly and accurately sharpen the teeth of different kinds and sizes of saws.

The invention consists in the combination and arrangement of parts set forth in the following specification and particularly pointed out in the claims.

Referring to the drawings:

Figure is a plan view of a machine embodying this invention.

Fig. 2 is a front elevation of the same.

Fig. 5 is a plan view illustrating in detail a work member and portions of the means which rotate and which move said work member lengthwise of the work.

Fig. 6 is a detail view of a portion of a grinding member for grinding one set of teeth of a saw, a portion of a saw being shown in connection with said grinder.

Fig. 7 is a detail view of a portion of a grinding member which grinds the opposite set of teeth from that ground by the member illustrated in Fig. 6, a portion of a saw being shown in this view.

Like numerals refer to like parts throughout the several views of the drawings.

Figure 3:
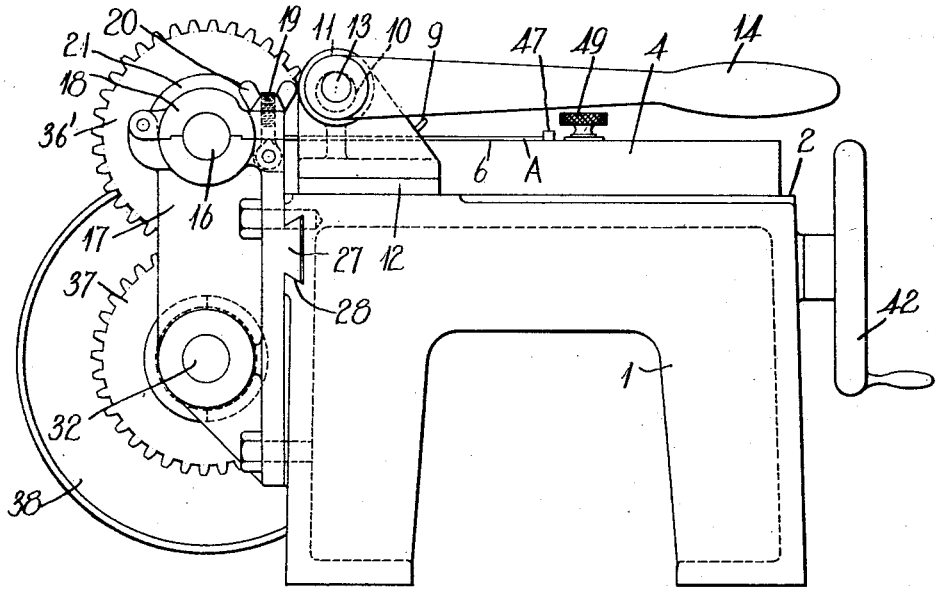
Fig. 3 is a left hand end elevation of the machine.
Figure 4:
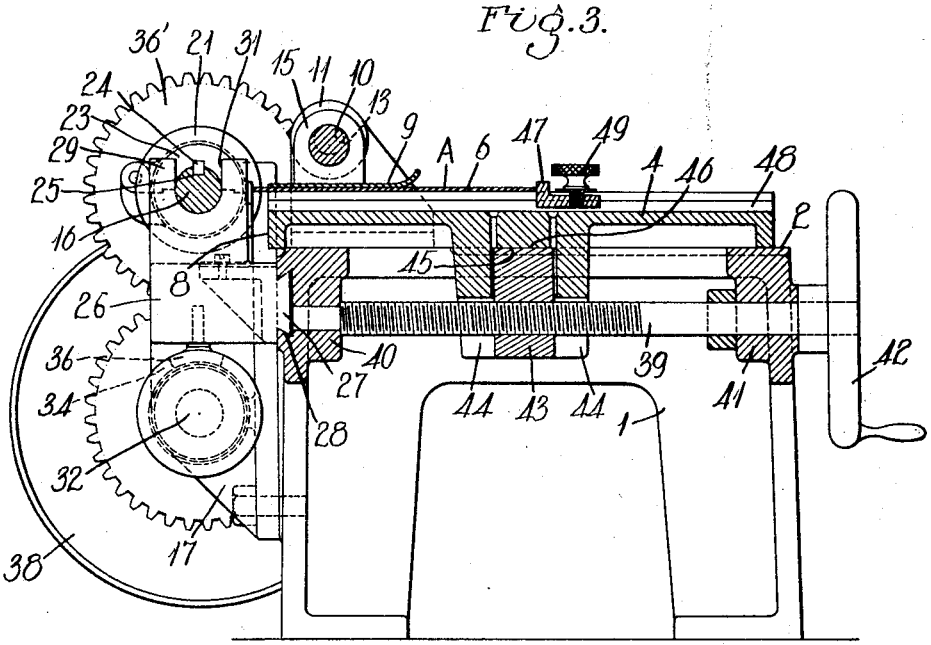
Fig. 4 is a section taken on the line 4—4 of Fig. 1.

In the drawings, 1 is a base, preferably provided with a horizontal surface 2 having grooves 3, 3 arranged transversely thereof. A saw support 4 is mounted upon the base 1 in contact with the surface 2 and has tongues 5 engaging the grooves 3 which guide the saw support transversely of said base. The saw support 4 is flattened on its upper surface at 6 to form a support for a saw A. The opposite ends of said support are recessed at 7 to receive the handle B of the saw, which is thicker than the blade C thereof, the forward edge 8 of said saw support extending substantially the length of the longest saw which may be sharpened upon the machine.

A plate 9 is arranged longitudinally of the support 4 adjacent to the edge 8, said plate substantially conforming with this portion of said support. A shaft 10 is arranged above the plate 9 in bearings 11, 11 secured to arms 12 on the saw support 4. Eccentrics 13, 13 are formed at opposite ends of the shaft 10 to engage said bearings 11. A lever 14 is attached to one end of said shaft for the purpose of rocking said shaft. The plate 9 is provided with a plurality of lugs 15 which encircle the shaft 10 and when said shaft is rocked by the handle 14 said lugs will transmit movement to the plate from said shaft to clamp the saw against the saw support or to release the same therefrom.

A shaft 16 is arranged adjacent to the forward edge 8 of the saw support 4 with its axis substantially parallel with said edge and approximately on a level with the upper surface thereof. This shaft is journaled to rotate in bearings 17, 17 at opposite ends of the base 1. The bearings 17 are provided with pivoted caps 18 adapted to be secured by screws 19 and thumb nuts 20 to permit said caps to be readily removed so that the shaft 16 may be readily detached.

Slidably mounted upon the shaft 16 is a grinding work member 21, preferably constructed of material such as carborundum, and having V-shaped helical grooves 22 formed in its periphery adapted to correspond to the shape of the teeth of the saw to be sharpened. The grinding member 21 is provided with a bushing 23 which is slotted to receive a key 24, said key also engaging a key way 25 extending substantially the length of the shaft 16. This slot permits the key 24 to slide with the grinding member 21 longitudinally of the shaft but causes said member to rotate with said shaft.

Mounted directly beneath the shaft 16 is a slide 26 having a tongue 27 adapted to engage a groove 28 extending longitudinally of the base 1. The slide 26 has arms 29 and 30 extending upwardly therefrom adjacent to opposite ends of the grinding member 21 and engaging the bushing 23 thereof. The arms 29 and 30 are forked at 31 to straddle the shaft 16, and being open at the top permit said shaft to be removed from the bearings 17 when the caps 18 thereof are swung to one side.

Another shaft 32 is arranged beneath the slide 26 parallel with the shaft 16, and is journaled to rotate in the bearings 17, 17.

This shaft is provided with cross screw threads 33 and 34 which are connected at opposite ends by circumferential portions 35. A follower 36, pivotally connected to the slide 26, is adapted to engage the screw threads 33 and 34 and upon the rotation of said shaft imparts a reciprocating movement to the slide 26 longitudinally of the shaft 16, whereby the grinding member 21 will be reciprocated longitudinally of the saw which is to be sharpened.

The pitch of the screw threads 33 and 34 is substantially the same as the pitch of the helical grooves 22 of the grinding member 21, while the two shafts 16 and 32 will be rotated at a uniform speed by means of gears 36' and 37 attached respectively to said shafts, motion being imparted thereto preferably by means of a pulley 38 fast to said shaft 32. The saw holder, including the saw support 4 and clamping plate 9, is adapted to be moved toward and away from the grinding member 21, preferably by means of a screw 39, rotatably mounted in bearings 40 and 41 formed in the base 1.

A hand wheel 42 is secured to said screw to facilitate the rotation thereof. Motion is imparted from the screw 39 to said saw support, preferably by means of a nut 43 engaging said screw and disposed between lugs 44, 44 depending from said saw support. The nut 43 has a flat surface 45 adapted to engage a flattened surface 46 on said saw support between said lugs 44 which prevent the rotation of said nut when said screw 39 is rotated, whereupon said saw support will be reciprocated on the base longitudinally of said screw.

Gages 47 are arranged to slide in grooves 48 extending transversely of the saw support 4 and these gages are adapted to be secured in the desired positions to position the saw relatively to said saw support by means of screws 49.

The operation of the machine hereinbefore specifically described is as follows:

A saw is placed upon the saw support 4 with the teeth thereof projecting slightly beyond the edge 8 of said support and said saw is then clamped against said support by means of the clamping plate 9 and eccentric shaft 10, the gages 47 being placed against the back edge of said saw to retain the same in position during the sharpening operation. The saw holder will then move forward by the hand wheel 42 and screw 39 until the edge of said saw containing the teeth thereof is in the correct position with respect to the center of the shaft 16.

Power is then applied to said shaft 32, which causes the grinding member 21 to be rotated in the proper direction, whereupon said grinding member will be moved by the screw-threaded shaft along the edge of the saw toward the right, Fig. 1, to grind the set of teeth corresponding with the angle of the teeth of the grinding member. After said grinding member has moved the length of the saw the saw support may be withdrawn and the operation of the shaft 16 continued, thereby causing the follower 36 to enter the straight portion 35 of the screw threaded shaft and later the opposite screw threads of said shaft, whereupon said grinding member will be returned to the left hand end of the shaft 16. The saw may then be advanced into a position to again be engaged by said grinder as it moves along toward the right hand end of the shaft 16.

After the sharpening of the first set of teeth has been completed the shaft 16 may be removed by releasing the caps 18 from the bearings 17. The grinding member 21 may then be removed from said shaft and a grinding member having teeth cut in the opposite direction, as shown in Fig. 7, substituted therefor, after which said shaft may be replaced and the operation continued until the sharpening of the second set of teeth has been completed.

Having thus specifically described my invention what I claim and desire by Letters Patent to secure is:

1. A saw sharpenening machine having, in combination, a saw holder, a helical work member adapted to engage the edge of said saw, means for rotating said helical work member, and means adapted to move said work member longitudinally of the axis thereof.

2. A saw sharpenening machine having, in combination, a work holder, a rotary grinding member, means for rotating said grinding member, means adapted to move said work holder toward and from said grinding member, and means adapted to reciprocate said grinding member longitudinally of said work holder.

3. A saw sharpening machine having, in combination, a saw holder, a shaft arranged to rotate about an axis substantially parallel with the edge of the saw, a grinding member slidably mounted on said shaft to rotate therewith, and means for reciprocating said grinding member longitudinally of said shaft.

4. A saw sharpening machine having, in combination, a saw holder, a shaft arranged to rotate about an axis substantially parallel with the edge of the saw, a grinding member slidably mounted on said shaft to rotate therewith, a slide movable longitudinally of said shaft adapted to engage said grinding member, and means adapted to reciprocate said slide.

5. A saw sharpening machine having, in combination, a saw holder, a shaft arranged to rotate about an axis substantially parallel with the edge of the saw, a grinding member slidably mounted on said shaft to rotate therewith, a slide movable longitudinally of said shaft, means on said slide adapted to engage opposite ends of said grinding member, and means adapted to reciprocate said slide, whereby said grinding member may be moved longitudinally of said saw.

6. A saw sharpening machine having, in combination, a work holder, a work member arranged to rotate about an axis substantially parallel with the edge of the work, a slide detachably engaging opposite ends of said work member, and means adapted to move said slide longitudinally of the axis of said work member in opposite directions.

7. A saw sharpening machine having, in combination, a saw holder, a shaft arranged to rotate about an axis substantially parallel with the edge of the saw, a grinding member slidably mounted on said shaft to rotate therewith, a slide movable longitudinally of said shaft, forked means on said slide adapted to straddle said shaft and engage opposite ends of said grinding member, and a rotatable cross threaded shaft adapted to move said slide in opposite directions.

8. A saw sharpening machine having, in combination, a saw holder, a shaft arranged to rotate about an axis substantially parallel with the edge of the saw, a helical grinder mounted on said shaft, means for rotating said shaft, and means adapted to move said grinder longitudinally of said saw.

9. A saw sharpening machine having, in combination, a base, a saw support arranged to slide on said base, a rotary reciprocatory grinding member adapted to engage the teeth of the saw to sharpen the same, means adapted to secure the saw on said support, and means to move said support toward and away from said grinding member.

10. A saw sharpening machine having, in combination, a base, a saw support slidably mounted on said base, a work member arranged to rotate about an axis substantially parallel with the edge of said saw support, helical teeth formed on said work member, a slide arranged on said base to slide longitudinally of said support, means on said slide adapted to engage said work member, and means to move said slide in opposite directions longitudinally of the axis of said work member.

11. A saw sharpening machine having, in combination, a saw support, means for securing a saw to said support, a detachable shaft, means adapted to rotate said shaft, a helical grinding member slidably mounted on said shaft to rotate therewith, and means adapted to move said grinding member longitudinally of said shaft in opposite directions.

12. A saw sharpening machine having, in combination, a saw holder, a shaft, a helical grinding member slidably mounted upon said shaft to rotate therewith, a slide adapted to engage opposite ends of said grinding member, a cross threaded shaft arranged substantially parallel with said shaft, a follower on said slide adapted to engage the threads of said cross threaded shaft, and means for rotating said shafts, whereby said grinding member may be reciprocated in opposite directions and rotated against the edge of the saw on said saw holder.

In testimony whereof I have hereunto set my hand in presence of two subscribing witnesses.

WILLIAM J. DAYS.

Witnesses:
SYDNEY E. TAFT,
HATTIE E. STRATTON.

Copies of this patent may be obtained for five cents each, by addressing the "Commissioner of Patents, Washington, D. C."